(No Model.)
L. A. JACKSON.
ELECTRIC LAMP.
No. 572,805. Patented Dec. 8, 1896.
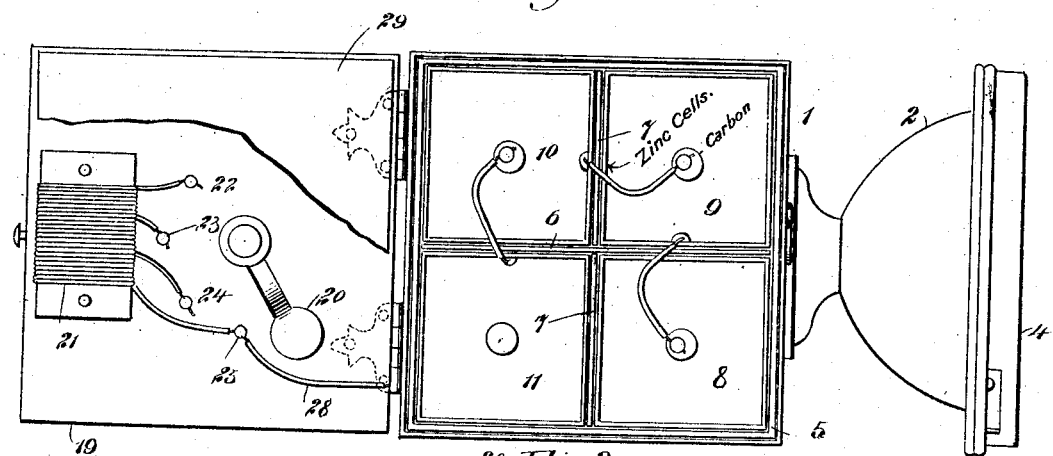

UNITED STATES PATENT OFFICE.

LOUIS A. JACKSON, OF NEW YORK, N. Y., ASSIGNOR TO THE ACME ELECTRIC LAMP COMPANY, OF SAME PLACE.

ELECTRIC LAMP.

SPECIFICATION forming part of Letters Patent No. 572,805, dated December 8, 1896.

Application filed July 25, 1896. Serial No. 600,514. (No model.)

*To all whom it may concern:*

Be it known that I, LOUIS A. JACKSON, of New York city, in the county and State of New York, have invented new and useful Improvements in Electric Lamps, of which the following is a full, clear, and exact description.

This invention relates to electric lamps adapted more particularly for use on wheeled vehicles, and especially bicycles and the like; and the object is to provide a lamp of simple construction that may be manufactured and sold at a comparatively small cost, that will not be extinguished by the movements and jarring of the vehicle to which it may be attached, and in which the lamp and battery are arranged in a compact form.

The invention consists in the construction and novel arrangement of parts, as will be hereinafter specified and particularly pointed out in the appended claims.

Reference is to be had to the accompanying drawings, forming a part of this specification, in which similar characters of reference indicate corresponding parts in all the views.

Figure 1 is a top plan view of a lamp embodying my invention and showing the cover as opened. Fig. 2 is a vertical section thereof. Fig. 3 is a top plan view with the cover closed. Fig. 4 is a front view of a container for the battery-cell, and Fig. 5 shows the construction of an incandescent lamp employed.

The invention comprises a metal casing 1, having a reflector 2 secured to its front, the said reflector supporting a glass 3, held in place by a flanged ring 4, removably secured around the outer end of the reflector.

With the casing 1 is removably arranged a battery container or box 5, of insulating material, such, for instance, as cardboard. This container or box is divided into a number of compartments, and within each compartment is placed a cell of the battery. As here shown, the container or box is divided transversely by partitions 6 7, of insulating material, and forming four chambers, within which are placed the dry battery-cells 8, 9, 10, and 11. Each cell consists of a metal casing, such, for instance, as zinc, to form one element of the cell, and a carbon element is extended vertically in the cell. The several cells are connected in series, that is, the carbon element of the battery 8 is connected with the zinc element of the battery 9, the carbon element of the battery 9 with the zinc element of the battery 10, and the carbon element of the battery 10 with the zinc element of the battery 11.

The reflector 2 is provided with a socket 12, in which removably engages the screw-threaded base of an incandescent lamp 13. One of the filaments within the lamp is connected to a yielding contact-piece, here shown as a coil-spring 14, secured to the end of the lamp-base and adapted to engage with the outer side or zinc element of the battery-cell 8.

The front of the container or box 5 is provided with an opening 15, within which is exposed a metal strip 16, having connection with the zinc element of the battery 8. To prevent a contact of said metal strip 16 with the battery-cell 9, which extends part way across the opening 15, I place a strip of insulating material 17 between the contact-strip 16 and the cell 9. The casing 1 is also provided with an opening 18, registering with or surrounding the opening 15 when the container or box 5 is within the casing. It will be seen that when the lamp 13 is screwed into place the yielding contact 14 will extend through the openings 18 and 15 and engage with the contact-strip 16.

Hinged to the top of the casing 1 is a cover 19, of insulating material, such, for instance, as wood. To the inner side of this cover is attached a contact-finger 20, adapted to engage with the carbon element of the battery-cell 11 when said cover is in a closed position, and also secured to the inner side of the cover is a rheostat 21, having connection with contact-pins 22, 23, 24, and 25, which extend through the cover and are adapted to be respectively engaged at their outer sides with a switch-arm 26, mounted to swing on a stud 27, having electrical connection with the contact-finger 20. From the contact-pin 25 a wire extends to a connection with the metal casing 1. As here shown the wire 28 connects with one of the hinges between the cover and box, this hinge being of course in electric connection with the casing. By means of the rheostat the resistance may be decreased as the power of the battery diminishes, that is, with a fresh battery the switch-arm 26 will be moved into connection with the pin 22. As the battery power decreases the arm may be moved successively into engagement with the other contact-pins, and when finally in engagement with the contact-pin 25 the rheostat will be wholly cut out. By this construction it will be seen that when the cover is closed and the switch-arm in engagement with one of the contact-pins the current will be from the carbon element of the cell 11 through the contact-finger 20, the switch-arm 26, the rheostat or wire 28, the casing 1 to the lamp-base which is connected with one end of the filament in the lamp and back through the spring-contact 14 to the contact-strip 16 on the battery-cell 8, the current of course being also through the several battery-cells.

The rheostat and several connections on the inner side of the cover 19 may be protected by a covering 29, of suitable insulating material, such, for instance, as leather. The casing may be provided with any desired means for securing the device to a vehicle. As here shown a loop 30 is secured to the rear side of the casing and is designed to engage with a hook or similar device attached to the vehicle.

It will be seen that in a lamp embodying my invention, after a battery shall have become worn out, the container or box 5 with the several cells may be removed from the casing 1 and a new battery inserted. Before removing or inserting the battery the lamp 13 should be removed, thus preventing the possible breaking of the spring-contact 14.

Having thus described my invention, I claim as new and desire to secure by Letters Patent—

1. An electric lamp, comprising a metal casing, an incandescent lamp supported thereon, a battery comprising a series of cells within the casing, the shell of each cell forming a battery element, a cover for the casing, a rheostat supported by said cover, and having electrical connection through the casing with the lamp-filament, a contact between said lamp-filament and one of the cell-shells, and means for closing the circuit between the rheostat and battery, substantially as specified.

2. An electric lamp, comprising a metal casing having an opening in its front, a reflector attached to said front and having a lamp-socket, an incandescent lamp removably mounted in said socket, a battery container or box of insulating material removably placed in the casing, and comprising a battery-cell arranged in each chamber, each cell comprising a carbon element and a zinc element, the said zinc element forming the shell for the cell, one of said shells having a portion exposed at an opening formed in the container or box, whereby the same may be engaged by a contact on the incandescent lamp, a cover of insulating material for the casing, a rheostat arranged on the inner side thereof and having electrical connection with the metal casing, contact-pins having engagement with the rheostat and extended through the cover, a switch-arm mounted to rotate on said cover, and a spring-yielding finger on the inner side of the cover in electrical connection with the switch-arm and adapted for engagement with a battery element, substantially as specified.

LOUIS A. JACKSON.

Witnesses:
JNO. M. RITTER,
CLARENCE R. FERGUSON.